United States Patent
Stählin

(10) Patent No.: US 11,985,575 B2
(45) Date of Patent: May 14, 2024

(54) SYSTEM AND METHOD FOR OPERATING VEHICLE IN MULTIPLE VEHICLE-TO-EVERYTHING (V2X) REGIONS

(71) Applicant: Continental Automotive Systems, Inc., Auburn Hills, MI (US)

(72) Inventor: Ulrich Stählin, Oakland Township, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 332 days.

(21) Appl. No.: 17/557,232

(22) Filed: Dec. 21, 2021

(65) Prior Publication Data

US 2023/0199444 A1 Jun. 22, 2023

(51) Int. Cl.
*H04W 4/40* (2018.01)
*G01S 19/51* (2010.01)
*H04W 4/021* (2018.01)

(52) U.S. Cl.
CPC ............. *H04W 4/40* (2018.02); *G01S 19/51* (2013.01); *H04W 4/021* (2013.01)

(58) Field of Classification Search
CPC ......... H04L 67/00; H04L 12/24; H04L 67/12; H04L 67/34; H04L 12/813; H04L 29/08; H04L 2209/84; H04W 4/44; H04W 4/46; H04W 4/40; H04W 4/50; H04W 4/021; H04W 4/02; H04W 4/029; H04W 4/30; G06F 8/65; G06F 8/61; G06F 9/445; G06F 9/06; G06F 9/00; G01S 19/51; G01S 13/931; G01S 17/931; G06Q 20/30; G06Q 20/308; G06Q 20/32

See application file for complete search history.

(56) References Cited

U.S. PATENT DOCUMENTS

| | | | |
|---|---|---|---|
| 6,937,877 B2 | 8/2005 | Davenport | |
| 9,215,598 B2 | 12/2015 | Vuyyuru et al. | |
| 2016/0295624 A1* | 10/2016 | Novlan et al. | H04W 76/023 |
| 2018/0102793 A1 | 4/2018 | Talty et al. | |
| 2019/0059129 A1* | 2/2019 | Luo et al. | H04W 76/28 |
| 2019/0215117 A1* | 7/2019 | Lee et al. | H04L 5/0048 |
| 2019/0268906 A1 | 8/2019 | Perdomo | |
| 2020/0076657 A1* | 3/2020 | Jpseph et al. | H04L 27/2601 |
| 2020/0154336 A1* | 5/2020 | Islam et al. | H04W 40/12 |
| 2020/0367030 A1 | 11/2020 | Baek et al. | |

(Continued)

FOREIGN PATENT DOCUMENTS

| | | |
|---|---|---|
| CN | 112333662 A | 2/2021 |
| WO | 2019133824 A1 | 7/2019 |
| WO | 2021178979 A1 | 9/2021 |

OTHER PUBLICATIONS

CN 116368776 A >>> Management Entity Adapted for Application (see title). (Year: 2023).*

(Continued)

*Primary Examiner* — Meless N Zewdu

(57) ABSTRACT

Based upon the current position of a vehicle, a processor determines which V2X communication standard to use. If a change from a current V2X protocol being used to a new protocol (required because of the location of the vehicle) is determined, software for the new protocol is loaded to re-configure the processor or other electronic devices in the VCU or elsewhere in the vehicle.

20 Claims, 4 Drawing Sheets

(56) References Cited

U.S. PATENT DOCUMENTS

| | | | |
|---|---|---|---|
| 2020/0401391 | A1 | 12/2020 | Ucar |
| 2021/0014820 | A1* | 1/2021 | Bodduru et al. ...... H04W 64/00 |
| 2021/0051606 | A1* | 2/2021 | Yang et al. ......... H04W 52/365 |
| 2021/0112415 | A1* | 4/2021 | Lee et al. .......... H04W 12/1002 |
| 2023/0087414 | A1* | 3/2023 | Opshaug et al. ...... H04B 17/27 |
| 2023/0095394 | A1* | 3/2023 | Srinivasan et al. ..... G01S 19/23 |

OTHER PUBLICATIONS

TW 202138988 A >>> Graphical User Interface System (see title). (Year: 2021).*

CN 1912885 B >>> System and Method for Secure Transaction Management and Electronic Rights Protection (see title). (Year: 2010).*

CN 114097257 A >>> SL HARQ Buffer Management for NR Vehicle Communication (see title). (Year: 2022).*

CN 113574930 A >>> V2X Communication Resources for Mobility Events (see title). (Year: 2021).*

CN 109167829 A >>> An Internet of Things Communication Method and a Cloud Gateway (see title). (Year: 2019).*

CN 108415689 A >>> Software-based Method of Ubiquitous Object Assembly (see title). (Year: 2018).*

Nathalie Haziza et al. "Multi-technology Vehicular Cooperative System Based on Software Defined Radio (SDR)", 2013, IEEE, DOI: 10.1007/978-3-642-37974-1_7.

"Harman Launches New Dual-Mode V2X System to Improve Automotive Safety", Harman, Jun. 5, 2019.

Sedar Roshan et al. "An Experimental Vehicular On-Board Unit for the Execution of Anticipated Cooperative Collision Avoidance Services in Cross-Border Scenarios", 13th International Conference on Automotive User Interfaces and Interactive Vehicular Applications. ACMPUB27, New York, NY, USA, Sep. 21, 2020, pp. 118-119, XP058621596, DOI: 10.1145/3411276.3414693 ISBN: 978-1-4503-8529-9.

International Search Report and Written Opinion dated Apr. 24, 2023 from corresponding International patent application No. PCT/US2022/053615.

* cited by examiner

SYSTEM AND METHOD FOR OPERATING VEHICLE IN MULTIPLE VEHICLE-TO-EVERYTHING (V2X) REGIONS

TECHNICAL FIELD

The technical field relates to vehicle-to-everything (V2X) communications and to operating vehicles in changing V2X environments.

BACKGROUND

In vehicle-to-everything (V2X) communications, communications are exchanged between a vehicle and other entities. For example, V2X communications may cover communications between the vehicle and other vehicles, between the vehicle and traffic infrastructure, or between the vehicle and various communications networks.

Different regions of the world use different communication protocols to implement V2X. For instance, two different V2X protocols include the cellular V2X (C-V2X) protocol and dedicated short-range communications (DSRC) protocol. Other V2X technologies include IEEE802.11bd standard protocols and fifth generation V2X (5GV2X) technologies.

Current equipment in vehicles such as vehicle control units (VCUs), engine control units (ECUs) or telematic control units (TCUs) incorporate or utilize a single V2X technology. Different applications in vehicles utilize V2X messages such as applications that control the operation of the vehicle (or components of the vehicle) or make predictions affecting vehicle operation (e.g., whether the vehicle will collide with another vehicle). Consequently, as the vehicle moves to a different region with a different technologies this equipment may not operate properly or may even completely fail to operate.

BRIEF DESCRIPTION OF THE DRAWINGS

For a more complete understanding of the disclosure, reference should be made to the following detailed description and accompanying drawings wherein.

Figure 1:
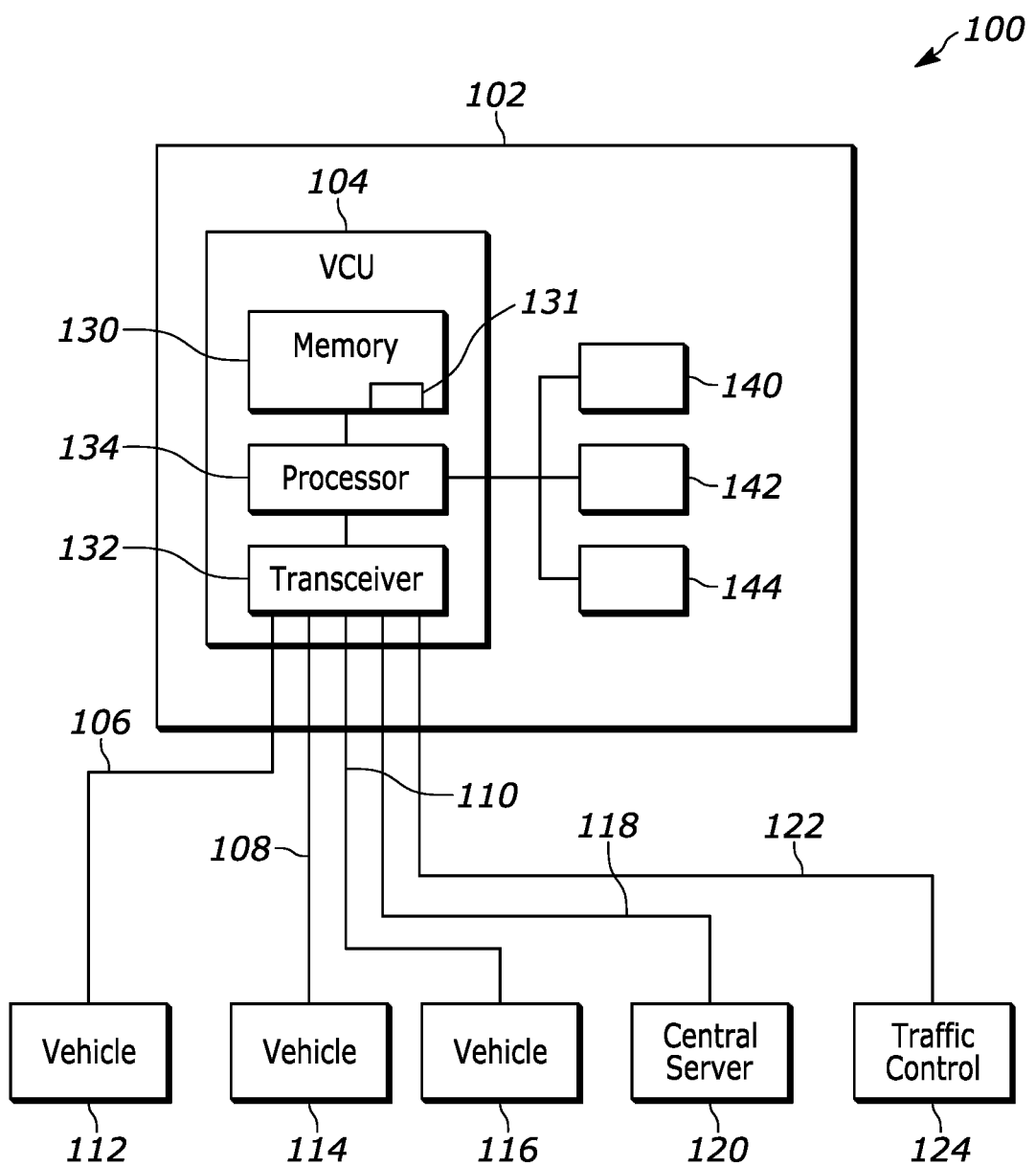
FIG. 1 comprises a diagram of a system according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

In the approaches provided herein and based upon the current position of a vehicle (e.g., the position obtained from a global navigation satellite system (GNSS) or global position satellite (GPS) system to mention two examples), a processor at a vehicle control unit (VCU) determines which V2X communication standard to use, e.g., based on accessing a database covering the regions for different technologies. If a change from a current V2X protocol being used to a new protocol (required because of the location of the vehicle) is determined, software for the new protocol is loaded to re-configure the processor and/or other electronic devices in the VCU (or elsewhere in the vehicle).

In other aspects, the processor and/or other electronic devices are loaded with detection software. This software listens to communication channels and detects which communication standard is being used for transmissions being made on the communication channels. As soon as the detection of usage of a new standard is robust enough, the software for the communication standard is loaded and the VCU is ready to be used for communications in the new region. Requiring robust reception before a change to a new protocol or standard is made is especially advantageous where different regions are using similar but still different V2X communication standards or protocols to communicate. This safeguard ensures that the change to a different protocol will only be made when a truly new protocol is detected.

In many of these embodiments, an approach for switching operation of an electronic device between vehicle-to-everything (V2X) protocols includes storing a plurality of software programs in a memory at a vehicle. Each of the plurality of software programs performs operations for a vehicle component and each of the programs conforms to a different V2X protocol. The approach further comprises detecting a trigger event. The trigger event indicates a movement of the vehicle from a first geographic region to a second geographic region. Each of the first and second geographic regions utilizes different V2X protocols. An identity of the second geographic region is determined based at least in part upon the trigger event. One or more software programs are selected from the plurality of software programs based at least in part upon the identity of the second geographic region. The selected one or more software programs are uploaded from the memory to an electronic device within the vehicle. The selected one or more software programs allow the electronic device to operate within a V2X environment of the second geographic region. The uploading is effective to change a configuration of the electronic device.

In aspects, the electronic device comprises a transceiver (e.g., a transceiver in a VCU). Other examples of electronic devices are possible and may be located anywhere in the vehicle.

In examples, the trigger event comprises a detection of a global position satellite (GPS) or global navigation satellite system (GNSS) position. In other examples, the trigger event comprises an examination and determination of types of messages received.

In other examples, the trigger event comprises a detection of a geofencing border. In some aspects, the software uploading occurs after the vehicle crosses the geofencing border.

In some other aspects, the one or more software programs are configured to operate a transceiver device. Other examples are possible.

In others of these embodiments, a system for switching operation of an electronic device between vehicle-to-everything (V2X) protocols includes an electronic memory in a vehicle. The electronic memory is configured to store a plurality of software programs. Each of the plurality of software programs performs operations for a vehicle component and each of the programs conforms to a different V2X protocol. The system also includes a processor and a transceiver device. The transceiver device is configured to receive and detect a trigger event. The trigger event indicates a movement of the vehicle from a first geographic region to a second geographic region wherein each of the first and second geographic regions utilizes different V2X protocols. The processor coupled to the electronic memory and the transceiver device. The processor is configured to: determine an identity of the second geographic region based at least in part upon the trigger event; select one or more software programs from the plurality of software programs based at least in part upon the identity of the second geographic region; upload the selected one or more software programs from the memory to an electronic device within the vehicle, wherein the selected one or more software programs allows the electronic device to operate within a V2X environment of the second geographic region. The uploading is effective to change a configuration of the electronic device.

In yet others of these embodiments, a non-transitory, machine-accessible storage medium having computer instructions. The instructions are configured, when executed on a processor to cause the machine to: store a plurality of software programs in a memory at a vehicle, each of the plurality of software programs performing operations for a vehicle component and each of the programs conforming to a different V2X protocol; detect a trigger event, the trigger event indicating a movement of the vehicle from a first geographic region to a second geographic region wherein each of the first and second geographic regions utilizes different V2X protocols; determine an identity of the second geographic region based at least in part upon the trigger event; select one or more software programs from the plurality of software programs based at least in part upon the identity of the second geographic region; upload the selected one or more software programs from the memory to an electronic device within the vehicle, wherein the selected one or more software programs allows the electronic device to operate within a V2X environment of the second geographic region. The uploading is effective to change a configuration of the electronic device.

Referring now to FIG. 1, one example of a system 100 that switches the operation of a vehicle control unit (VCU) (or other electronic device or devices) between V2X protocols is described. The system 100 includes a vehicle 102 and the vehicle 102 includes a VCU 104. The VCU 104 includes an electronic memory 130, a transceiver device 132, and a processor or control circuit 134. The VCU 104 operates to transmit and receive communications (including V2X messages) from other vehicles as described elsewhere herein. In other examples, the VCU 104 controls operations of subsystems or components of the vehicle 102 such as the steering system or the braking system. In still other examples, the VCU 104 may include a user interface an communicate messages to the driver of the vehicle 102. The messages transmitted and received may be compliant with a V2X protocol.

V2X protocols may specify message formats, bit rates, address formats, modulation scheme, channel access methods and data mapping to mention a few examples. In other words and in aspects, V2X protocols specify the various rules by which two entities in a V2X system or network communicate. Various electronic devices such as the processor 134 and/or transceiver device 132 deploy, utilize, and/or are configured according to a V2X protocol in order to effectively transmit, receive, and/or process V2X messages compliant with a particular V2X protocol. The exact rules and details of a particular V2X protocol may be defined by incorporated in, or utilized by one or more software programs 131. When these software programs 131 are loaded into the processor 134, transceiver device 132, and/or other electronic device, the device is configured to operate according to a particular V2X protocol.

The vehicle 102 may have systems or subsystems 140, 142, and 144 that couple to the processor 134. The systems or subsystems 140, 142, and 144 may include the engine system, the braking system, the tire system, and the entertainment systems of the vehicle to mention a few examples. In some aspects, V2X messages received are used to control these systems. For example, the messages may set parameters that alter the operation of these components. In another example, the messages can directly control the operation of steering or braking components.

The electronic memory 130 is any type of electronic memory device and stores the programs 131. For example, the electronic memory 130 may be or can include any one or combination of volatile memory elements (e.g., random access memory (RAM), such as dynamic RAM (DRAM), static RAM (SRAM), synchronous dynamic RAM (SDRAM), video RAM (VRAM), and so forth) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The transceiver device 132 is implemented as any combination of hardware or software. The transceiver device 132 transmits, receives, and/or processes messages according to a particular V2X protocol. In these regards, the transceiver device 132 may include an antenna, processors, a memory, digital circuitry, and/or analog circuitry. These elements may be programmable or changeable and have operating parameters that may be set, controlled, or refined. For example, these elements may be changed to accommodate different transmission and reception rates (e.g., bit rates) or recognize different message formats. It will be appreciated that changing parameters by control signals (e.g., from the processor 134) physically changes these elements by changing values, flipping or setting switches, or changing other physical characteristics.

The transceiver device 132 is configured to transmit and/or receive electronic messages to and/or from senders over communication channels 106, 108, and 110. In this case, the communication channels 106, 108, and 110 communicate with other vehicles 112, 114, and 116. Another communication channel 118 communicates with a central server 120. Still another communication channel 122 communicates with a traffic control device 124. The traffic control device 124 may be, in examples, a traffic light. Other examples of traffic control devices are possible. The transceiver device 132 may be any combination of hardware or software that enables the transmission of reception of electronic messages including formatting, decoding, and encoding functions. Other examples of functions are possible.

As mentioned, the electronic memory 130 stores the programs 131 that allow the VCU 104 (or other electronic device) to operate in various V2X systems and/or networks. In examples, these programs 131 may define how to decode, encode, transmit, and receive messages according to a particular protocol. If the messages are encoded or decoded improperly using the incorrect system, then the elements of the system 100 will not function properly. In other words, the programs 131 operate the VCU 104 according to V2X protocols. A first program (or group of programs) may operate the VCU 104 according to a V2X protocol, a second program (or group of programs) operates the VCU 104 according to a second V2X protocol, and so forth. The memory 120 may also store a data structure that maps regions to V2X protocols. In other words, uploading the programs 131 to a particular electronic device causes the reconfiguration of the electronic device.

It will be appreciated that as used herein the term "processor" or "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 134 may be configured (for example, by using corresponding programming stored in a memory as will be well understood by those skilled in the art) to carry out one or more of the steps, actions, and/or functions described herein. The control circuit 134 may include a memory that includes computer instructions that implement any of the functions described herein.

In one example of the operation of the system of FIG. 1, the processor 134 is configured to detect a trigger event that is related to the vehicle 102 moving from a first geographic region to a second geographic region. The processor 134 is configured to determine an identity of the second geographic region based at least in part upon the trigger event; select one or more of the software programs 131 from the plurality of software programs 131 based at least in part upon the identity of the second geographic region; and upload the selected one or more software programs 131 from the memory 130 to an electronic device (e.g., the transceiver device 132 or processor 134 of the VCU 104) within the vehicle. The selected one or more software programs 131 allows the electronic device (e.g., the transceiver device 132 or processor 134) to operate within a V2X environment of the second geographic region.

In aspects, the uploading is effective to change a configuration of the electronic device (e.g., the transceiver device 132 or processor 134 of the VCU 104). For example, the transceiver device 132 may have its configuration changed to transmit and/or receive electronic messages according to a particular V2X protocol. Configuration information may include or define the communication message formats the transceiver device 132 recognizes or the bit rates by which it receives and/or transmits messages to mention two examples. It will be appreciated that changing the configuration of the transceiver device 132 (or other electronic device) involves physical changes to the device including throwing switches, changing parameters or component values (e.g., varying the resistance of a variable resistor or capacitor), changing recognizable formats, and changing transmission and reception bit rates to mention a few examples.

In the approaches described herein, a requirement for robustness in received communications may be implemented. More specifically, a change is not made as between operating according to one V2X protocol and a different V2X protocol until a confidence or certainty that such a change would be correct is determined. The requirement of robust reception before the change to a new protocol or standard is made is especially advantageous where different regions are using similar but still different communication V2X standards to communicate.

In one specific example, the processor 134 analyzes messages to determine differences in format between different messages formed according to different V2X protocols. The processor 134 may be programmed to know that a first V2X standard has ten rules and a second V2X standard also has ten rules. Seven of the rules are shared and three are different. The processor 134 may at a first point in time may detect one of the different rules is being implemented (e.g., as a format characteristic) in received messages but will not change from the first V2X protocol to the second V2X protocol until all the differences have been detected thereby ensuring it is making a correct protocol switch from the first V2X protocol to the second V2X protocol.

Figure 2:
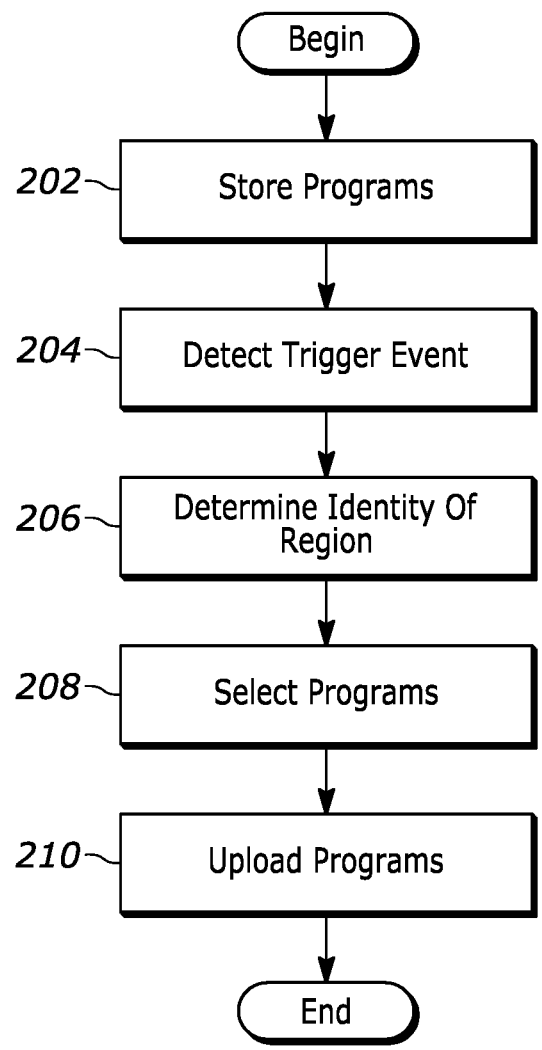
FIG. 2 comprises a flowchart of an approach according to various embodiments of the present invention.

Referring now to FIG. 2, one example of an approach of operating in different V2X regions is described.

At step 202, a plurality of software programs are stored in a memory at a vehicle. Each of the plurality of software programs perform operations for a vehicle component and each of the programs conform to a different V2X protocol. For example, one program may specify the bit rates of received or transmitted communications and formats recognized by a transceiver all according to a first V2X protocol. Another program may specify the bit rates of received or transmitted communications and formats recognized by a transceiver all according to a second V2X protocol. Still another program may specify the bit rates of received or transmitted communications and formats recognized by a processor all according to the first V2X protocol. Yet another program may specify the bit rates of received or transmitted communications and formats recognized by a processor all according to the second V2X protocol.

At step 204, a trigger event is detected. The trigger event indicates a movement of the vehicle from a first geographic region to a second geographic region and each of the first and second geographic regions utilizes different V2X protocols. The trigger event may be based upon sensing the location of the vehicle (or change of location) or may be based upon detection of a geo fence to mention two examples.

At step 206, an identity of the second geographic region is determined based at least in part upon the trigger event. For example, the coordinates of the second geographic region may have a known range so that the trigger event is identified once coordinates in the range are detected. The identity of the region is associated with a specified V2X protocol. In examples, a mapping or mapping table may be used to store the relationship between geographic areas and the V2X protocols that are used within the geographic region. It will be appreciated that the geographic region may be a state, city, county, or any area specified by a user (no matter what the size of the area). For example, the table may indicate that in a Region 2, V2X protocol B is used.

At step 208, one or more software programs from the plurality of software programs are selected based at least in part upon the identity of the second geographic region. As mentioned, each of the plurality of software programs perform operations for a vehicle component and each of the programs conform to a different V2X protocol. For instance, when the vehicle crosses from a first region (using first V2X protocol) to a second region (using a second V2X protocol), software programs that will configure an electronic device such as a transceiver according to the second V2X protocol are selected. In the above-mentioned example, programs associated with V2X protocol B are retrieved or obtained.

At step 210, the selected one or more software programs from the memory to an electronic device within the vehicle are uploaded to the electronic device (e.g., the VCU and devices in the VCU). The selected one or more software programs allow the electronic device to operate within a V2X environment of the second geographic region. The uploading is effective to change a configuration of the electronic device.

Figure 3:
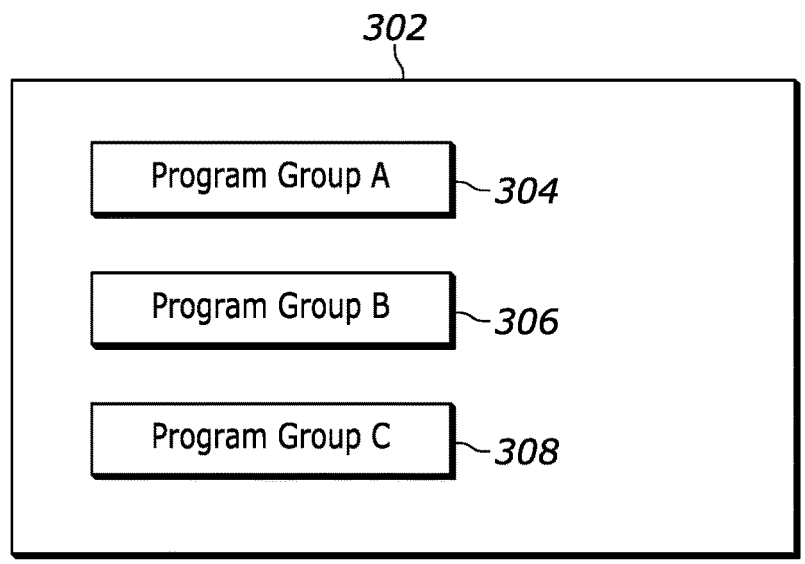
FIG. 3 comprises a flowchart according to various embodiments of the present invention.

Referring now to FIG. 3, one example of the programs stored in memory is described. It will be appreciated that these programs may be uploaded into the memory at system initialization, e.g., when the car is assembled. However and in other aspects, these programs can be updated and dynamically changed, for example in a repair shop.

The memory 302 includes program groups 304, 306, and 308. Each includes one or more programs that configure and/or operate different devices in a VCU or engine control unit (ECU) or some other electronic device in a vehicle.

Program group 304 includes one or more programs for operating in region A and conform to a first V2X protocol. When these programs are uploaded to the electronic device (e.g., the transceiver), they operate and/or configure the electronic device to operate according to the first V2X protocol.

Program group 306 one or more programs for operating in region B and conform to a second V2X protocol. When these programs are uploaded to the electronic device (e.g., the transceiver), they operate and/or configure the electronic device to operate according to the second V2X protocol.

Program group 308 one or more programs for operating in region C and conform to a third V2X protocol. When these programs are uploaded to the electronic device (e.g., the transceiver), they operate and/or configure the electronic device to operate according to the third V2X protocol.

Figure 4:
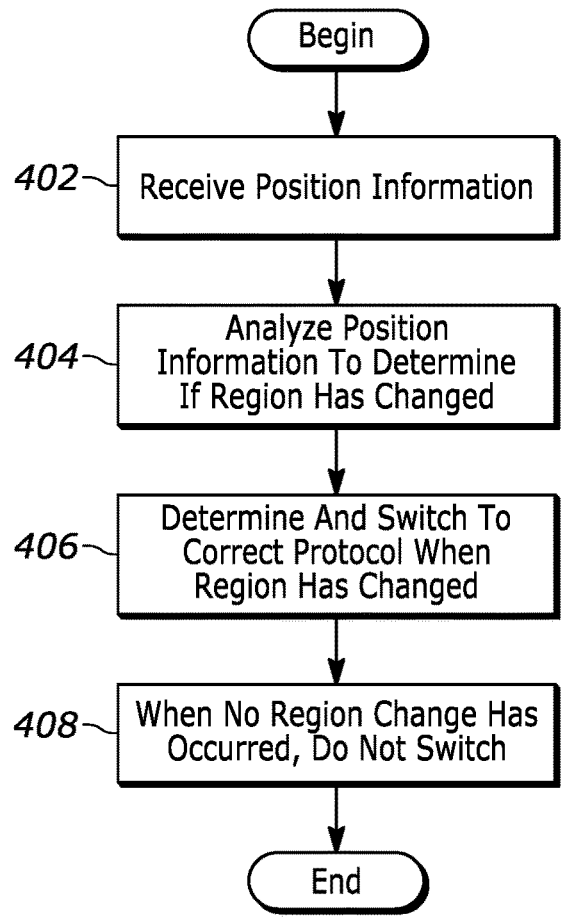
FIG. 4 comprises a flowchart according to various embodiments of the present invention.

Referring now to FIG. 4, one example of an approach for listening for and detecting triggering events is described. This approach can be executed continuously or periodically.

At step 402, an electronic device such as a transceiver listens (e.g., receives or senses communications) indicating its geographic position (e.g., a GPS or other position). In another example, the devices could listen for messages in order to detect a type of V2X protocol being used by the messages. In another example, both approaches can be used.

In yet another example, the device may store the identity of the last V2X protocol being used before a vehicle was shut down.

The device should also detect when it is about to cross a geofence border and only start sending V2X messages when it was sure it had crossed the geofence border. Geofencing uses technologies like GPS, or IP address ranges to build their virtual fence. These virtual fences can be used to track the physical location of the device active in the particular region or the fence area. In other aspects, the location of the person using the device is taken as geocoding data and can be used further for advertising purposes.

At step 404, the position and/or type of message are examined or analyzed to determine if a switch from one region to another region has occurred. For example, some approaches may use triangulation approaches to determine the position while others simple receive geographic coordinates. In other examples, the messages are examined to determine the protocol being used, for example looking at the field or other information in the message. Or, a determination may be made that the device is approaching or has just crossed the geofence.

At step 406 and if there is a detected change in regions, then a switch to the correct V2X protocol. For example, a lookup table may be used. In one specific example, ranges of geographic coordinates (e.g., coordinates with ranges that are within region A) are mapped to V2X protocol 1. In another example, messages with certain fields map to V2X protocol 2.

At Step 408, when a switch is not a region change, then a switch to different programs is not made.

Figure 5:
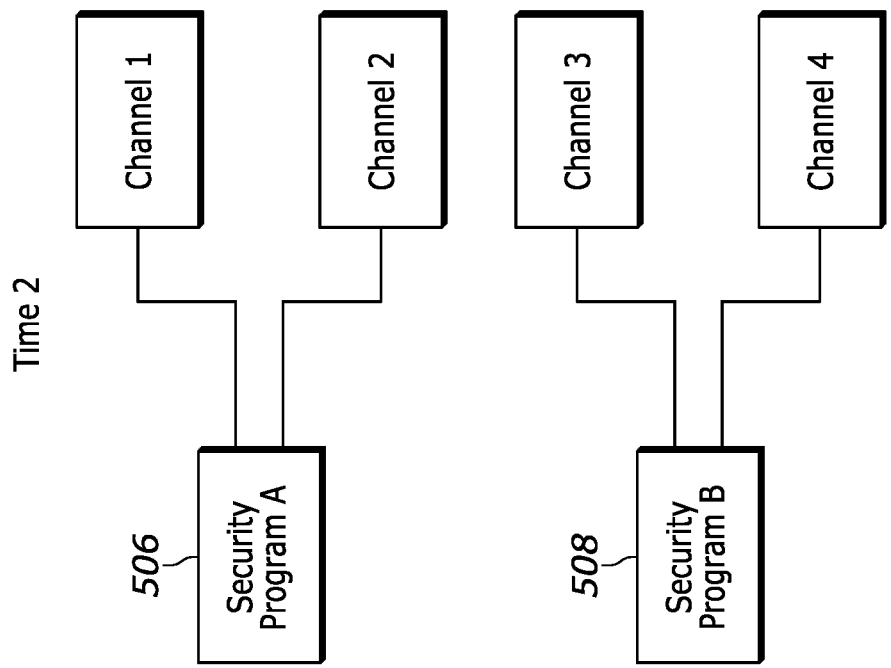
FIG. 5 comprises a diagram of an approach for usage of security protocols according to various embodiments of the present invention.
Figure 5:
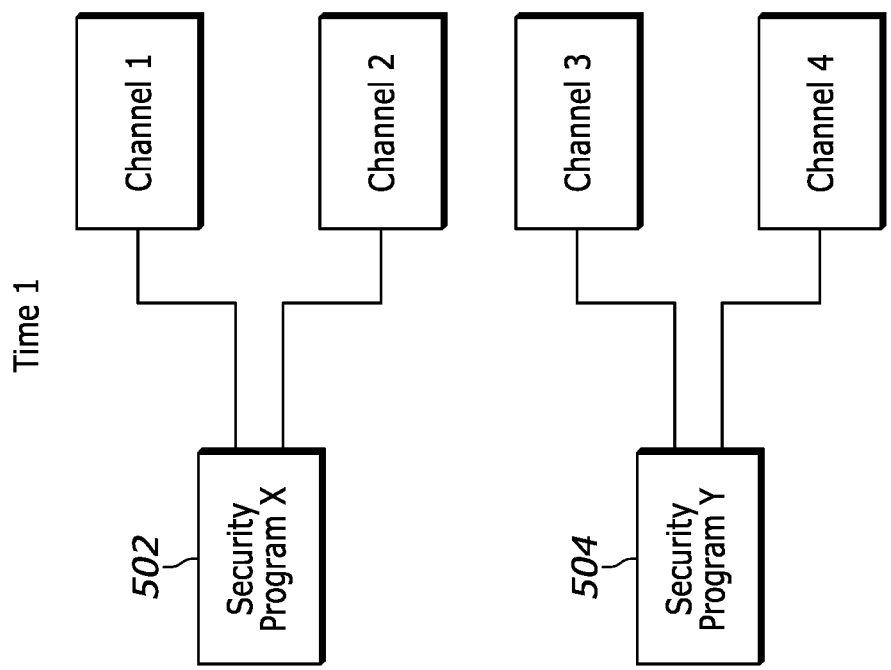

Referring now to FIG. 5, one example of changing security programs and assigning different security programs to different communication channels is described. Security protocols are the type of cryptographic programs used can also be changed according to location. In aspects, different standards could be used for different communication channels. In other aspects, network security protocols generally implement cryptography and encryption techniques to secure the data so that it can only be decrypted with a specific algorithms, logical key, mathematical formula and/or a combination of all of them. Some example protocols include the Secure File Transfer Protocol (SFTP), Secure Hypertext Transfer Protocol (HTTPS) and Secure Socket Layer (SSL). Other examples are possible.

In one specific example and as shown in FIG. 5, the protocol used varies by channel and by location. At time 1, security program X (502) is used for channel 1 and channel 2 and security program Y (504) is used for channel 3 and channel 4.

At time 2: (or based upon a trigger event or a location change), the system uses security program A (506) for channel 1 and channel 2 and security program B (508) for channel 3 and channel 4.

The mappings between channels and security programs can be included in a lookup table. Other examples of data structures may also be used.

It should be understood that any of the devices described herein (e.g., the control circuits, the controllers, the receivers, the transmitters, the sensors, any presentation or display devices, or the external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method for switching operation of an electronic device between vehicle-to-everything (V2X) protocols, the method comprising:
    storing a plurality of software programs in a memory at a vehicle, each of the plurality of software programs performing operations for a vehicle component and each of the programs conforming to a different V2X protocol;
    detecting a trigger event, the trigger event indicating a movement of the vehicle from a first geographic region to a second geographic region wherein each of the first and second geographic regions utilizes different V2X protocols;
    determining an identity of the second geographic region based at least in part upon the trigger event;
    selecting one or more software programs from the plurality of software programs based at least in part upon the identity of the second geographic region;
    uploading the selected one or more software programs from the memory to an electronic device within the vehicle, wherein the selected one or more software programs allows the electronic device to operate within a V2X environment of the second geographic region;
    wherein the uploading is effective to change a configuration of the electronic device.

2. The method of claim 1, wherein the electronic device comprises a transceiver device.

3. The method of claim 1, wherein the trigger event comprises a detection of a global navigation satellite system (GNSS) position.

4. The method of claim 1, wherein the trigger event comprises an examination and determination of types of messages received.

5. The method of claim 1, wherein the trigger event comprises a detection of a geofencing border.

6. The method of claim 5, wherein the uploading occurs after the vehicle crosses the geofencing border.

7. The method of claim 1, wherein the one or more software programs are configured to operate a transceiver device.

8. A system for switching operation of an electronic device between vehicle-to-everything (V2X) protocols, the system comprising:
    an electronic memory in a vehicle, the electronic memory being configured to store a plurality of software programs, each of the plurality of software programs performing operations for a vehicle component and each of the programs conforming to a different V2X protocol;
    a transceiver device, the transceiver device being configured to receive and detect a trigger event, the trigger event indicating a movement of the vehicle from a first geographic region to a second geographic region wherein each of the first and second geographic regions utilizes different V2X protocols;
    a processor coupled to the electronic memory and the transceiver device, the processor being configured to:
    determine an identity of the second geographic region based at least in part upon the trigger event;
    select one or more software programs from the plurality of software programs based at least in part upon the identity of the second geographic region;
    upload the selected one or more software programs from the memory to an electronic device within the vehicle, wherein the selected one or more software programs allows the electronic device to operate within a V2X environment of the second geographic region;
    wherein the uploading is effective to change a configuration of the electronic device.

9. The system of claim 8, wherein the electronic device comprises the transceiver device.

10. The system of claim 8, wherein the trigger event comprises a detection of a global navigation satellite system (GNSS) position.

11. The system of claim 8, wherein the trigger event comprises an examination and determination of types of messages received.

12. The system of claim 8, wherein the trigger event comprises a detection of a geofencing border.

13. The system of claim 12, wherein the uploading occurs after the vehicle crosses the geofencing border.

14. The system of claim 8, wherein the one or more software programs are configured to operate the transceiver device.

15. A non-transitory, machine-readable storage medium having computer instructions and wherein the instructions are configured, when executed on a processor to cause the machine to:
    store a plurality of software programs in a memory at a vehicle, each of the plurality of software programs performing operations for a vehicle component and each of the programs conforming to a different V2X protocol;
    detect a trigger event, the trigger event indicating a movement of the vehicle from a first geographic region to a second geographic region wherein each of the first and second geographic regions utilizes different V2X protocols;
    determine an identity of the second geographic region based at least in part upon the trigger event;
    select one or more software programs from the plurality of software programs based at least in part upon the identity of the second geographic region;
    upload the selected one or more software programs from the memory to an electronic device within the vehicle, wherein the selected one or more software programs allows the electronic device to operate within a V2X environment of the second geographic region;
    wherein the uploading is effective to change a configuration of the electronic device.

16. The storage medium of claim 15, wherein the electronic device comprises a transceiver device.

17. The storage medium of claim 15, wherein the trigger event comprises a detection of a GPS position.

18. The storage medium of claim 15, wherein the trigger event comprises an examination and determination of types of messages received.

19. The storage medium of claim 15, wherein the trigger event comprises a detection of a geofencing border.

20. The storage medium of claim 15, wherein the uploading occurs after the vehicle crosses the geofencing border.

\* \* \* \* \*